UNITED STATES PATENT OFFICE.

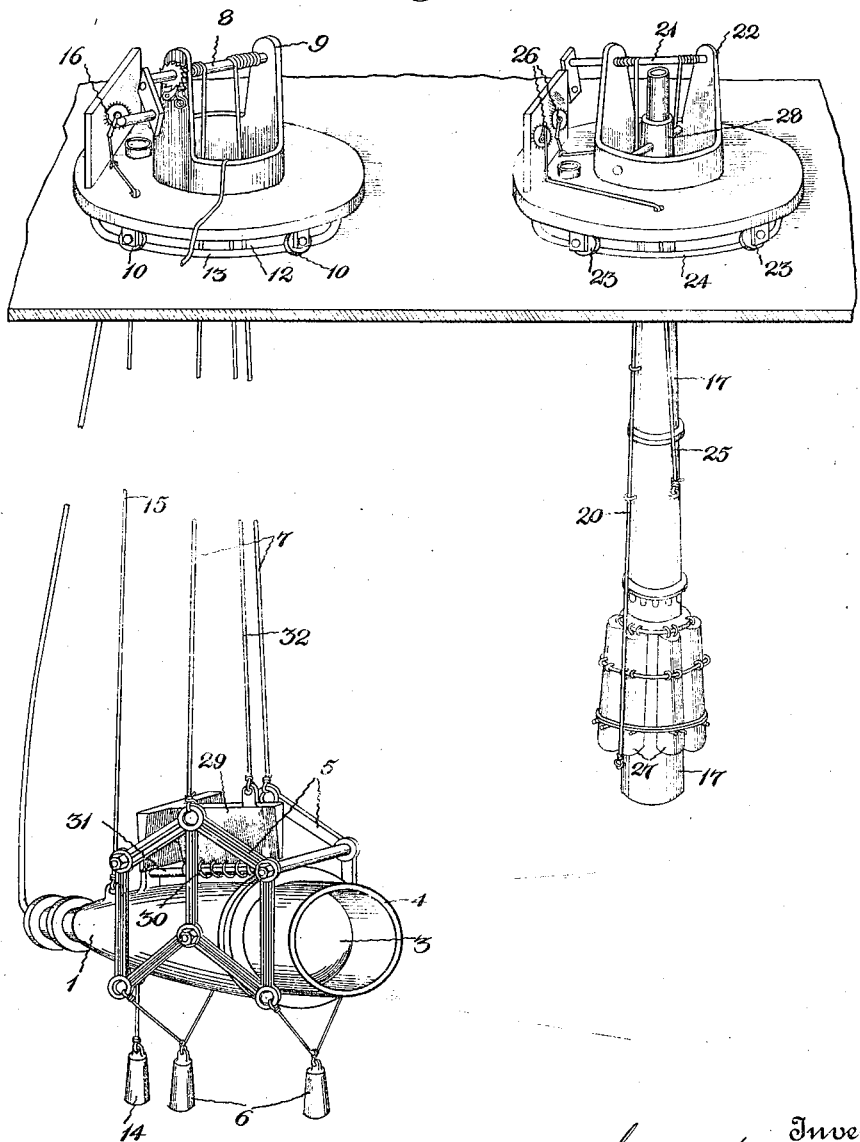

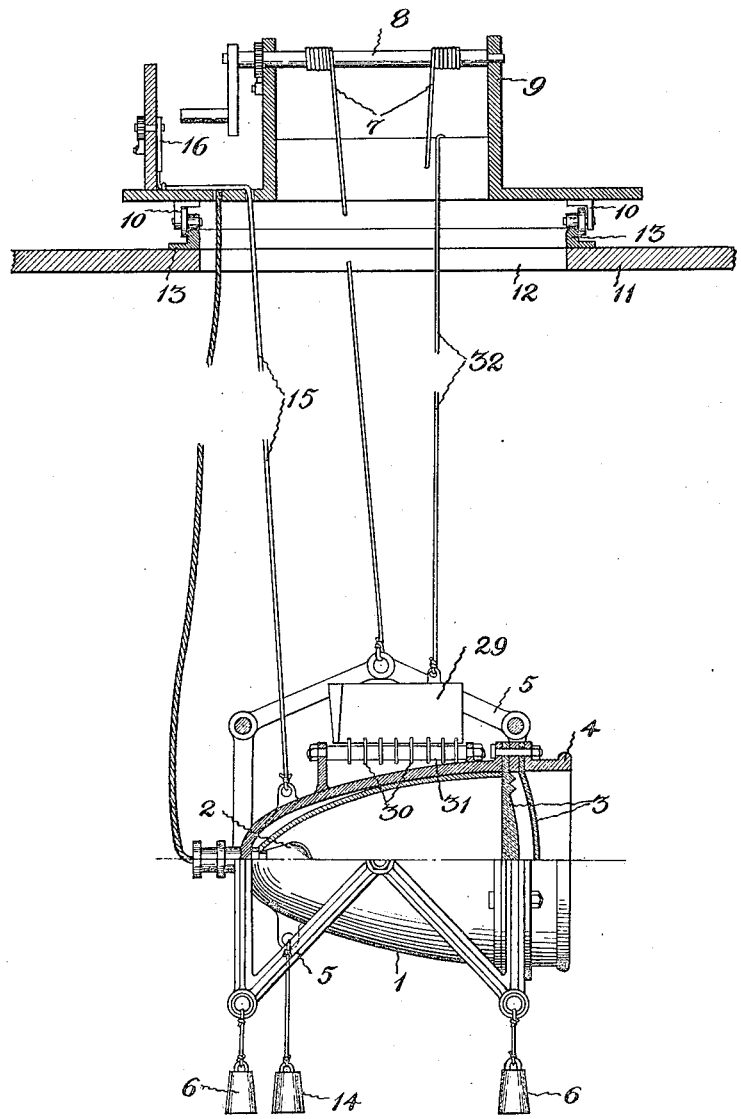

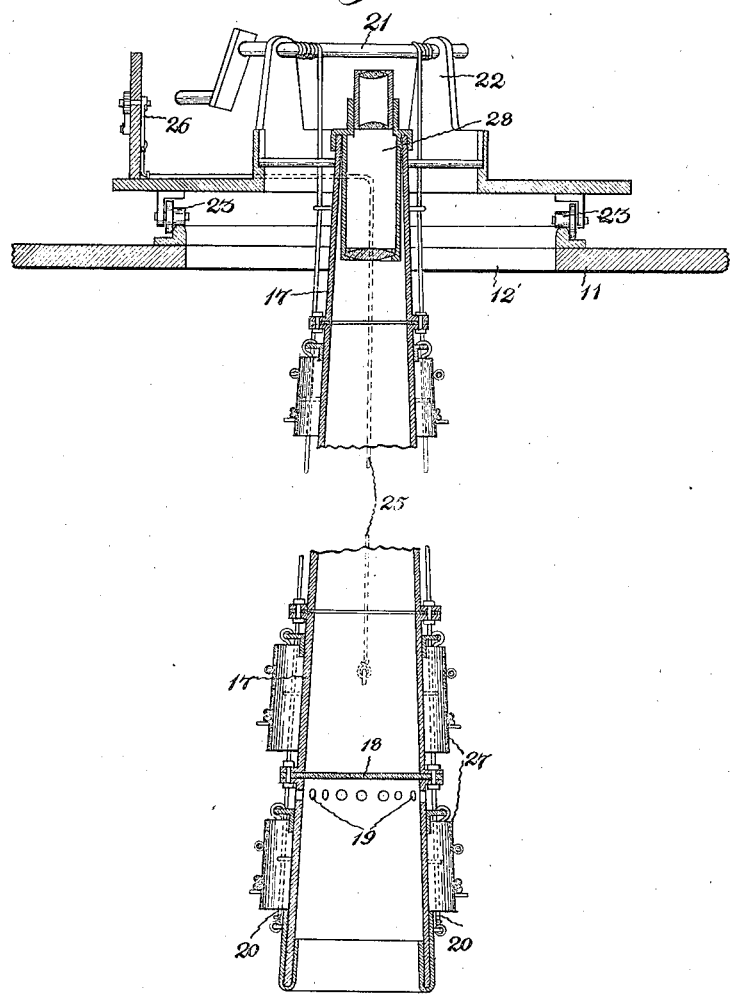

HIDEO KATAYAMA, OF ASHIGARA SHIMO-GUN, KANAGAWA-KEN, JAPAN.

SEARCH-LIGHT REFLECTOR.

1,282,432.      Specification of Letters Patent.      Patented Oct. 22, 1918.

Application filed April 25, 1917. Serial No. 164,459.

*To all whom it may concern:*

Be it known that I, HIDEO KATAYAMA, a subject of the Emperor of Japan, residing at No. 596 Mannen 4-Chome, Odawara-Machi, Ashigara Shimo-Gun, Kanagawa-Ken, Empire of Japan, engineer, have invented certain new and useful Improvements in Search-Light Reflectors, of which the following is a specification.

This invention relates to an observation apparatus and has for its object the provision of such device whereby objects submerged in water may be viewed, even though they might be located at a far greater depth below the surface than heretofore has been considered practicable for observation work.

To accomplish the above, my observation apparatus consists basicly in a source of illumination and a source of observation, such latter source being located in the path of light produced by the former.

That my invention may be more clearly understood I have hereto attached three sheets of drawings in which:

Figure 1 is a perspective view showing both the illuminating and observation units in applied positions.

Fig. 2 is a detail view of the means whereby I illuminate the water and objects located thereunder.

Fig. 3 is a detail view of the observation apparatus.

Referring more particularly to these drawings it will be seen that, in connection with the source of illumination, 1 designates the outer casing of a source of light provided with a reflector supplied with the conventional electric bulb 2 and provided with a double water-tight lens 3 from which extends the flange 4, serving as a protector for the lens 3 as well as confining the rays of light to a specific area.

The casing 1 is pivotally mounted within what might be termed a cradle 5, provided with weighted members 6 serving to sink the casing 1 as well as to steady the same against current action.

Upon a plate 11, which may be located in the bottom of an observation boat or any other convenient place, is provided a circular track member 13 located around an opening 12 formed in the base of such plate, which track member 13 is engaged by wheels 10 carrying a turntable. Secured to the turntable are standards 9 mounting a windlass 8 between them around which is coiled a cable 7 having secured to its opposite end the cradle 5.

Further mounted on the turntable is a crank arm 16 positioned upon a disk which is carried in a suitable bearing in such a manner that any pull exerted on the same will be registered by the disk. It will be understood that this measuring instrument is to be of any conventional design.

Extending from the crank arm 16 is a cable 15 being secured at its lower end to the casing 1 at a position to the rear of the pivot by means of which the said casing is mounted to the cradle 5. Below the casing at a point approximately in line with the end of the cable 15 is a weight 14 which exerts such a pull upon the casing 1 that it tends to depress this end of the casing so as to swing the flange end 4 upwardly. It will be noted that all that is necessary to do to depress or raise the flanged end of the casing 1 will be to exert more or less pull upon the cable 15 causing a rocking of the rear end of the casing 1 around the pivot point by which it is secured to the cradle 5.

It will be noted that by the above device I have provided a source of light which will be practical under all normal conditions, but attention is invited to the fact that under a strong current the source of light might be given a rocking motion, or an oscillating motion due to the contour of the casing 1, cradle 5 and the pull upon the cables 7 and 15 exerted by the current. To overcome this defect, I have provided a T-shaped steadying member 29 which I preferably form wedge-shaped as shown in the drawing. This steadying member is secured to the casing 1 by means of a rod 31 provided on the upper face thereof to which it is secured, by means of what might be termed a hinge joint, comprising in reality a number of rings 30. This member 29 may be inclined to either the right or left and held in such inclined position by means of the cable 32 which extends upwardly to the turntable.

The plate 11 is further provided with an additional opening 12' around which is secured a track member supporting a turntable by means of wheels 23 engaging such track member. Suspending from this turntable, by the hereinafter more fully described apparatus, is an observation device comprising a number of units 17 which may be of any suitable construction, providing, however, they may be easily assembled and perfectly water-tight. Between the lower of these sections is clamped a glass plate 18 and the lowermost of such sections are provided with openings 19 so as to permit the water to rise in this last section and reach a point directly below the lower face of the glass 18. The sections 17 are further provided with weights 27 serving to submerge the device, as well as to steady the same.

Provided on the turntable are standards 22 supporting between them a windlass 21 around which is wound the ends of cables 20 having their lower ends secured to the lowermost section 17.

A pair of cables 25 are provided having their lower ends secured to one of the sections 17 whereby, upon exerting a pull upon the same, the sections 17 can be made to assume a more or less inclined position. The opposite ends of the cables 25 are secured to a pair of crank arms 26, provided with measuring devices whereby the pull or tension of each cable can be measured.

An ordinary barrel telescope, or other suitable viewing device 28 is provided at the uppermost section 17 whereby objects located below the glass 18 may be viewed.

It will be noted that by the above apparatus I have provided a source of illumination capable of being directed in any direction which will also be held steady in almost any current or tide. Also that I have provided an observation device capable of being rotated or inclined into any position desired.

I wish to further state that although numerous devices have been provided for observing the ocean bed and water, that none of the heretofore known devices has provided an observation device by means of which the object under investigation could be viewed when the same is located below a certain depth. By my new and improved device I am enabled to clearly investigate any conditions below this depth.

Having thus described my invention, what I claim is:—

1. An observation device more particularly adapted for use in connection with submarine work, including a plate provided with a pair of openings, turntables provided with windlasses located above such openings and a source of illumination, and an observation device connected one to each of said windlasses respectively by means of cables.

2. An observation device more particularly adapted for use in connection with submarine work, including a plate provided with a pair of openings, turntables provided with windlasses located above such openings and a source of illumination, and an observation device connected one to each of said windlasses respectively by means of cables, the source of illumination being provided with means for preventing a deflection of the same due to current action.

3. An observation device more particularly adapted for use in connection with submarine work, including a plate provided with a pair of openings, turntables provided with windlasses located above such openings and a source of illumination, and an observation device connected one to each of said windlasses respectively by means of cables, the source of illumination being provided with means for preventing a deflection of the same due to current action, such means comprising a wedge-shaped T-member hingedly secured along its lower edge to the uppermost portion of such source of light.

4. An observation device more particularly adapted for use in connection with submarine work, including a plate provided with a pair of openings, turntables provided with windlasses located above such openings and a source of illumination, and an observation device connected one to each of said windlasses respectively by means of cables, and means for inclining such source of illumination and observation apparatus, such means comprising cables secured thereto and having their uppermost ends secured to means adapted to register the tension thereof.

In testimony whereof I affix my signature in presence of two witnesses.

HIDEO KATAYAMA.

Witnesses:
H. YASUMARE,
S. NAKANO.